United States Patent [19]

Barnes et al.

[11] 4,269,665

[45] May 26, 1981

[54] DRYING QUATERNARY AMMONIUM COMPOUNDS

[76] Inventors: Carl E. Barnes, 482 Trinity Pass Rd., New Canaan, Conn. 06840; Arthur C. Barnes, 320 Stamford Ave., Stamford, Conn. 06902

[21] Appl. No.: 84,813

[22] Filed: Oct. 15, 1979

Related U.S. Application Data

[60] Division of Ser. No. 39,773, May 17, 1979, Pat. No. 4,217,442, which is a continuation-in-part of Ser. No. 899,066, Apr. 24, 1978, abandoned.

[51] Int. Cl.$^3$ .............................................. B01D 3/36
[52] U.S. Cl. ........................................ 203/14; 203/58; 564/291
[58] Field of Search ................................ 203/57–59, 203/91, 14, 12; 260/567.6 R, 567.6 H, 567.6 F, 567.6 M, 567.6 P

[56] References Cited

U.S. PATENT DOCUMENTS

| 2,638,463 | 5/1953 | Ney et al. | 528/326 |
|---|---|---|---|
| 2,809,958 | 10/1957 | Barnes et al. | 528/326 |
| 2,973,343 | 2/1961 | Ney | 528/326 |
| 3,060,153 | 10/1962 | Follett | 528/326 |
| 3,069,392 | 12/1962 | Clark et al. | 528/326 |
| 3,132,078 | 5/1964 | Backlund | 203/58 |
| 3,148,214 | 9/1964 | Trenton | 260/567.6 R |
| 3,174,951 | 3/1965 | Taber | 528/326 |
| 3,174,951 | 3/1965 | Taber | 528/326 |
| 3,721,652 | 9/1970 | Barnes | 528/326 |
| 3,835,100 | 9/1974 | Sekiguchi et al. | 528/326 |
| 4,098,774 | 7/1978 | Bacskai | 528/315 |

OTHER PUBLICATIONS

Die Makromolekulare Chemie, 161, p. 64, (1972).
"Chemical Engineer's Handbook", Perry, 4th Ed., pp. 13–46 to 13–51.

*Primary Examiner*—Frank Sever

[57] ABSTRACT

A method of drying quaternary ammonium compounds for use as additives in the anhydrous anionic polymerization of 2-pyrrolidone is disclosed.

The method consists of dissolving or suspending the quaternary ammonium compound in 2-pyrrolidone and distilling over, under reduced pressure, a portion of the 2-pyrrolidone whereby the water is removed.

2 Claims, No Drawings

DRYING QUATERNARY AMMONIUM COMPOUNDS

RELATED APPLICATIONS

This application is a division of application Ser. No. 039,773 filed May 17, 1979 now U.S. Pat. No. 4,217,442, which in turn was a continuation-in-part of application Ser. No. 899,066 filed Apr. 24, 1978 now abandoned

BACKGROUND OF THE INVENTION

This invention relates to a method of drying quaternary ammonium compounds for use as accelerators in the polymerization of 2-pyrrolidone.

Quaternary ammonium compounds are notoriously hygroscopic and difficult not only to dry but to keep dry. Even momentary contact with air at normal humidities will cause these substances to pick up enough water so that they cannot be used as additives in the polymerization of 2-pyrrolidone which requires substantially anhydrous conditions.

The anionic polymerization of 2-pyrrolidone is well known in the art and was first disclosed in U.S. Pat. No. 2,638,463. Improved methods of polymerizing 2-pyrrolidone are disclosed in many subsequent patents, for example U.S. Pat. No. 3,721,652, but all involve the use of a metallic derivative of 2-pyrrolidone, or a similar derivative, as the catalyst. Preferred metals are the alkali metals except lithium. To initiate the polymerization an additional substance, customarily called an "activator" is required. Preferred activators are $CO_2$ or $SO_2$ although many other substances such as N-acetyl pyrrolidone may be used. In order for the polymerization to occur the system must be substantially anhydrous. It has been determined that the presence of more than about 0.1% water by weight based on the 2-pyrrolidone monomer effectively retards or prevents polymerization and less than this amount of water is preferred.

It has been found that the addition of quaternary ammonium salts to the polymerization mixture causes a marked increase in the rate of polymerization provided that the overall moisture content is kept below the 0.1% critical value. Such an increase in the rate of polymer formation is of great commercial importance since prior art methods have provided only comparatively low conversions in 24 hours or longer.

Quaternary ammonium compounds are notoriously very hygroscopic and are therefore nearly always wet. They are also difficult to dry because they are thermally unstable. Drying is usually attempted by heating under a good vacuum and, depending upon the thermal stability of the particular quaternary ammonium compound, much of the water may be removed but usually not all. The operation is at best a compromise between a need to raise the temperature to a point where all the water may be removed and a need to keep the temperature below the point where some thermal decomposition occurs. When intended for addition to a 2-pyrrolidone polymerization mixture, slight thermal decomposition is almost as detrimental as having some water present since the amines formed in the decomposition are inhibitors to the polymerization.

It is therefore the object of this invention to provide a simple and practical method of forming an anhydrous solution or suspension of quaternary ammonium compounds in 2-pyrrolidone free of inhibiting thermal decomposition products.

SUMMARY OF THE INVENTION

We have found that quaternary ammonium compounds for use as accelerators in the polymerization of 2-pyrrolidone can be made anhydrous by adding the wet quaternary ammonium compound to monomeric 2-pyrrolidone and then distilling over, under vacuum, from 5 to 50% of the pyrrolidone, the water distilling over with pyrrolidone. The amount of pyrrolidone which must be distilled over depends on the amount of water present in the quaternary ammonium coumpound. The point at which the water is removed may be detected by a drop in the pressure.

DETAILED DESCRIPTION OF A PREFERRED EMBODIMENT

Typically the invention is practiced by first titrating the amount of quaternary ammonium salt in a water solution or in a wet condition and then weighing, without the need of a dry box, an amount in a wet state equal to the desired amount of the anhydrous salt. This amount of wet quaternary ammonium compound is then added to 2-pyrrolidone and the mixture distilled under vacuum, both the pyrrolidone and water coming over. The point at which the mixture is anhydrous may readily be detected by a drop in pressure.

During the distillation process the pot temperature never exceeds 100°–110° C. and may be lower with a good vacuum and/or the use of a wiped-film evaporator. It has been determined that most quaternary ammonium compounds and especially those useful as accelerators in the polymerization of 2-pyrrolidone, are stable up to 120° C. at least.

The anhydrous solution or suspension of the quaternary ammonium compound in 2-pyrrolidone thus prepared may be added to the polymerization mixture, again without the use of a dry box or similar device. Conveniently the amount of 2-pyrrolidone used to dry the quaternary ammonium compound may be selected to comply with a polymerization recipe which is best illustrated by means of the following examples:

EXAMPLE 1

A quantity of wet tetrabutyl ammonium bisulfate equal to 6.0 grams (0.018 mol) of the anhydrous salt was added to 70 grams of purified 2-pyrrolidone in a 250 ml 3-necked flask equipped with a gas inlet tube, a thermometer for measuring pot temperature and a distillation head also having a thermometer for measuring the temperature of the vapor. The distillation head was connected to a condenser and a receiver having a vacuum connection. Water at about 35° C. was circulated through the condenser for cooling.

The system was evacuated to 5 mm Hg pressure and 20 grams of pyrrolidone was distilled over carrying with it the water from the hygroscopic quaternary ammonium salt. While the water was distilling over with the pyrrolidone the pressure rose to 10 mm Hg and the pot temperature at this point was 108° C. When all the water had distilled over the pressure again dropped to 5 mm thus indicating that no more pyrrolidone need be distilled over to insure dryness.

The pressure in the flask was then brought to atmospheric by admitting nitrogen gas through the gas inlet tube and the mixture cooled to room temperature. The pyrrolidone solution of the quaternary ammonium salt was then poured into a small polyethylene bottle and tightly capped for use later.

The alkaline catalyst was then prepared by placing 70 grams of purified 2-pyrrolidone in a 250 ml 3-necked flask, equipped as described above, and adding 7.8 grams of 85% assay potassium hydroxide (0.12 mol anhydrous). After evacuating the system, 20 grams of the pyrrolidone was distilled over to remove the water formed by the reaction of the KOH with the amide hydrogen of the 2-pyrrolidone to form the potssium salt, the actual catalyst. Again the pressure rose to 10 mm while the water was distilling over and dropped to 5 mm when the solution became anhydrous. The liquid in the flask was then cooled to room temperature and dry nitrogen gas was admitted to bring the pressure to atmospheric.

The anhydrous solution of tetrabutyl ammonium bisulfate stored in the polyethylene bottle was then added to the flask thus making 100 grams of dry 2-pyrrolidone containing the tetrabutyl ammonium bisulfate and the potassium salt of 2pyrrolidone. The system was again evacuated and 0.03 mol of dry $CO_2$ was added to initiate polymerization. The vacuum connection was then closed and dry nitrogen was admitted to bring the pressure to atmospheric. Then the cloudy mixture was quickly poured into a polyethylene polymerization bottle, capped and placed in a oven maintained at 50° C. After 2½ hours the bottle was removed and dropped into liquid nitrogen which coused the polymer cake to break up. After grinding, washing with water and drying, the conversion was found to be 46%. The viscosity, measured as a 5% solution in 88% formic acid was 15 Stokes, corresponding to an inherent viscosity of 5.1 when measured as a 0.5 g/dl solution in hexafluoroisopropanol at 25° C.

EXAMPLE 2

The procedure of Example 1 was followed except for the following changes:

In place of the tetrabutyl ammonium bisulfate, 21.3 grams of a 60% aqueous solution of tetrabutyl ammonium sulfate was added to 80 grams of 2-pyrrolidone and 32 grams of the pyrrolidone was distilled over to give an ahydrous solution containing 12.8 grams (0.022 mol) of the quaternary ammonium salt.

In making the alkaline catalyst only 3.9 grams of 85% KOH was used (0.059 mol anhydrous) being added to 80 grams of 2-pyrrolidone and 23 grams distilled over.

In place of the $CO_2$, 0.006 mol of $SO_2$ (diluted with dry nitrogen) was used to initiate the polymerization. After 3½ hours at 38° C. the conversion was 63% and the viscosity was greater than 148 Stokes (a molecular weight well in excess of 1 million).

EXAMPLE 3

6.0 grams (0.055 mol) of moist tetramethyl ammonium chloride was added to 70 grams of 2-pyrrolidone in the reaction flask equipped as described in Example 1. 20 grams of the pyrrolidone was distilled over under vacuum to remove the water from the quaternary ammonium salt. 4.0 grams (0.06 mol) of potassium hydroxide pellets (85% assay) was added to 70 grams of purified 2-pyrrolidone in the reaction flask and 20 grams distilled over under vacuum.

The two solutions were mixed as described in Example 1. 0.0059 mol of $SO_2$ was added and the mixture was poured into a polymerization bottle and heated at 50° C. for 8 hours. At the end of this time the polymer cake was ground, washed with water and dried. The conversion was 46% and the viscosity 27 Stokes corresponding to an inherent viscosity of 5.6 dl/g in hexafluoroisopropanol.

It will thus be seen that quaternary ammonium compounds containing considerable water may easily and quickly be made anhydrous for use as accelerators in the polymerization of 2-pyrrolidone. Since certain changes may be made in the exact proceedures without departing from the scope of the invention, it is intended that the examples as well as the descriptive matter be interpreted as illustrative rather than in a limiting sense.

What is claimed is:

1. The method of drying water wet quaternary ammonium compounds comprising adding the wet quaternary ammonium compound to an amount of 2-pyrrolidone greater than that required to azeotrope all of said water and distilling off under vacuum from 5 to 50 percent of the 2-pyrrolidone whereby a substantially anhydrous liquid solution of the quaternary ammonium compound in 2-pyrrolidone is formed.

2. The method of claim 1 wherein the anion of the quaternary ammonium compound is selected from the group consisting of halide, sulfate and bisulfate.

* * * * *